Jan. 7, 1964  F. H. INE  3,116,513
POULTRY CLOACA CLEANING APPARATUS
Filed Nov. 15, 1960  2 Sheets-Sheet 1

INVENTOR.
Frank H. Ine
BY
Townsend and Townsend
Attorneys

Jan. 7, 1964 F. H. INE 3,116,513
POULTRY CLOACA CLEANING APPARATUS
Filed Nov. 15, 1960 2 Sheets-Sheet 2
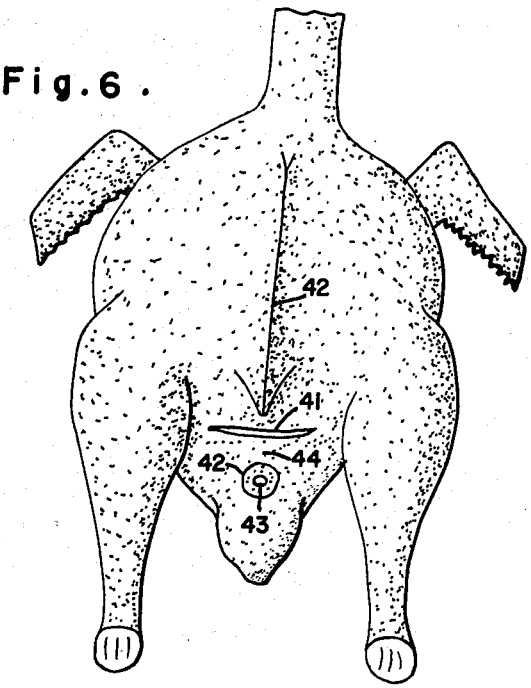
Fig. 6.
Fig. 7.
INVENTOR.
Frank H. Ine
BY
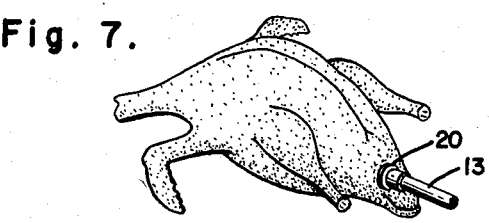

United States Patent Office

3,116,513
Patented Jan. 7, 1964

3,116,513
POULTRY CLOACA CLEANING APPARATUS
Frank H. Ine, Milwaukee, Wis., assignor to John Mohr & Sons, Chicago, Ill., a corporation of Illinois
Filed Nov. 15, 1960, Ser. No. 69,324
10 Claims. (Cl. 17—11)

This invention relates to the evisceration of poultry, and more particularly, relates to a means for flushing the cloaca and lower intestinal tract of poultry during the evisceration process.

General practice in commercial poultry eviscerating lines involves the de-feathering of the fowl which are then moved suspended from conveyor lines through various eviscerating stations. It is generally considered preferred practice to make a horizontal evisceration cut across the abdomen of the bird slightly aft of the end of the keel—the cut usually being one and a half to two inches in length and from which the viscera from the abdominal cavity of the bird is removed. However, prior to removal of viscera from the cavity, it is conventional practice to make a circular cut or incision around the vent opening to disengage the vent from the skin of the bird, and so that when the stomach and intestines of the bird are removed through the horizontal evisceration cut, the vent and its attached cloaca can be pulled out through the horizontal cut.

To prevent fecal matter in the vent or cloaca from extruding from the vent and contacting and soiling any part of the bird's body or abdominal cavity during the evisceration process, it is current practice for an operator to manually "strip" or "milk" the cloaca to extrude therefrom fecal matter prior to removing the viscera through the horizontal evisceration cut. Milking of the cloaca is usually done while the bird is moving suspended from a conveyor chain and at a station that includes several shower spray nozzles which operate to wash off any filth that may accumulate on the outside of the bird adjacent the vent area. The actual stripping or milking process is done by the operator placing the fingers of one hand inside the horizontal evisceration cut and squeezing the large intestine and cloaca to cause the fecal matter to be extruded therefrom and to drop down into a suitable depository and/or to be washed away by the spray nozzles. This hand "milking" process normally removes only a small percentage of the intestinal contents and frequently, the practice is not efficient enough to prevent contamination of the bird during a later stage of the evisceration process. More specifically, after the vent is cut and the cloaca milked, the vent and intestine, or cloaca, are passed under the bar strap, which is the strap of flesh and skin formed between the horizontal evisceration cut and the vent cut. If there is any leaking or extrusion of fecal matter from the vent during this process or any subsequent step in the evisceration process, the bird is deemed contaminated and is not considered fit for human consumption until it has been given extra attention and thoroughly cleansed. Government inspectors will normally condemn birds that still have a stain after they have been given a special washing, and this, in turn, requires the cutting away of the bar strap entirely which effectively spoils the style of packaging most generally used. Heretofore, operators have sought to reduce losses of poultry and/or loss of time and labor due to inadequate milking of the cloaca, by slowing up operations at this stage of the line, or by putting on additional operators, either of which alternatives is self-defeating when one considers the objectives sought to be obtained in the first instance. Some processors refuse to handle birds that show any signs of diarrhea. This causes flock owners to market their birds, regardless of market conditions, on showing any signs of illness that may lead to diarrhetic conditions in the flock. Generally speaking, the problem of cleansing the vent and cloaca regions of poultry constitutes a significant problem to which the present invention is believed to provide a substantially complete practical solution.

Briefly stated, the present invention includes the concept of flushing the lower intestines or cloaca of a bird with water while selectively, and usually simultaneously, withdrawing from the intestines by pneumatic suction the flushing water introduced into the intestine along with fecal matter intermixed with the flushing water.

The particular embodiment of a device useful in the practice of the invention and which per se is believed to constitute a novel structure includes a frame supporting a tubular barrel which terminates in an outer open nozzle end of a particular construction and a vacuum valve gate cooperating therewith.

In the exemplary embodiment, the barrel houses a water and air discharge passage and a vacuum suction outlet passage, each selectively operable respectively to discharge water and air into or to exhaust waste material from the open nozzle end of the barrel. In operation, the nozzle end of the barrel is inserted through the vent into the cloaca of a bird and selectively controlled to discharge a preselected mixture of water and air through the nozzle into the cloaca and lower intestines, which is thereafter selectively withdrawn, along with entrained fecal matter, outwardly through the suction outlet passage housed within the barrel. The selectivity for the water-air application as well as the removal of the water and fecal matter is obtained by operation of a trigger controlling a vacuum control valve gate and water-air valve.

By adjusting the actuating points of the valve assemblies it is possible to charge the intestinal cavity prior to opening the vacuum control valve gate for removing the waste products. This has important advantages with respect to the successful processing of turkeys and similar poultry products. Practice of the invention permits the great majority of fecal matter to be removed from the cloaca and lower intestines of each bird without permitting any external extrusion or droppings to emerge through the vent opening to contact or soil the body of the bird.

A principal object, therefore, of the invention is to provide a novel means useful in the art of poultry evisceration capable of fulfilling the purposes and advantages hereinabove briefly mentioned.

A more specific object of the invention is to provide a novel evisceration device operable to introduce water and air into a localized body area, such as the cloaca, of a bird while substantially simultaneously withdrawing water and waste matter mixed with the water from the localized area and in such manner as to prevent either flushing water or eviscerated matter from contacting or soiling other body areas of the bird.

Other objects and advantages of the invention will become apparent upon reading the following specification and referring to the accompanying drawings in which similar characters of reference represent corresponding parts in each of the several views.

In the drawings:

FIG. 6 is a front elevational view of a bird in the process of evisceration and showing the horizontal evisceration cut and the circular vent opening cut; and FIG. 7 is a perspective view of a bird at reduced scale illustrating the utility of the device herein described with reference to the practice of the invention.

Figure 1:
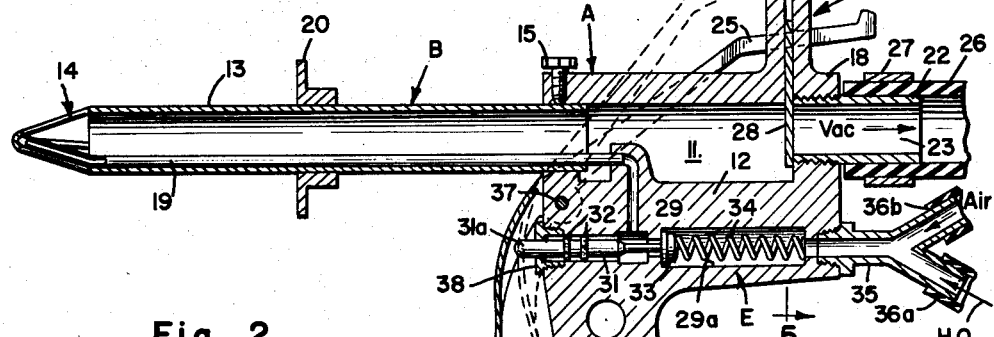
FIG. 1 is a side view cross-section of the present invention.

Referring more specifically to the drawings, the reference character A indicates a frame or chassis on which is mounted a barrel and nozzle assembly indicated generally at B. The frame A is adapted for manual support and operation by virtue of a pistol grip C. A pivotal trigger mechanism D is provided to actuate the water valve assembly E and vacuum control gate valve F.

The frame A is apertured at 11 and the lower body 12 of the frame A houses the water valve mechanism E.

The assembly heretofore indicated generally at B comprises, more specifically, an outer tubular barrel 13 the base end of which is supported in the forward end of aperture 11 and held securely therein by one or more set screws 15. Slidably mounted on the barrel is a stop flange or annular abutment 20 which can be adjustably positioned in fixed relation along the barrel by tightening of a set screw (not shown). Positioning of the stop member 20 can be used to determine the extent of maximum desired insertion of the device into the vent opening of the bird as will be later described. The outer end of the barrel 13 is fitted with a nozzle tip 14, the latter being formed with a plurality of rod like members 16 tapered to a point at their forward end. The end 17 of a water-air discharge tube 19 is positioned interior of and immediately adjacent the common end of rods 16.

The inner end of the nozzle tip 14 is welded or otherwise affixed to the open end of the barrel 13.

The barrel 13 constitutes a suction outlet and encloses the water-air discharge tube 19. The other end 18 of the frame A which forms the rear end of the barrel 13 is connected to an enlarged hose coupler 22 which is centrally bored as at 23 in communication and fixedly secured within frame A by suitable set screw (not shown). The rearward projecting extremities of coupler 22 provide a means by which the end of a flexible suction hose 26 may be clamped as at 27.

The vacuum control gate valve F includes a pair of vertical guide plates 24 on each side of which are extended the tines of control member 25 which form a part of the trigger D and controls the raising and lowering of valve plate 28. The exemplary valve is described in more detail in my Patent 2,723,831 which issued on November 15, 1955. Suffice it here to note that when the control member is caused to move upwardly by depressing the trigger D, the valve plate 28 is moved upwardly to open the suction outlet and when the trigger is released, the plate 28 closes off the suction outlet.

The inner end of water-air discharge pipe 19 emerges from the inner end of the barrel and is connected into valve chamber 29 of the valve assembly heretofore indicated generally at E.

The valve assembly E comprises, in addition to chamber 29, a valve stem 31 which is reciprocally supported within the reduced portion of the chamber 29 by O-rings 32 so as to move valve head 33 carried by the stem into and out of engagement with the reduced valve seat portion of the chamber 29. A spring 34 mounted in chamber 29a normally biases the valve head 33 to seated position to shut off flow of water and air from the Y-connector 35 via chamber 29 into barrel 19. The valve head and its associated stem 31 may be reciprocated to open and closed positions by trigger D pivotally mounted to frame A by pin 37 and in contact with the outer end 31a of the stem which projects through a suitable retaining nut or packing gland 38. Stated otherwise, the squeezing of trigger D toward handle C depresses stem 31 causing the valve head 33 to move away from seated position and permit water and air to flow from the inlet hose 36a and 36b around the valve head into the chamber 29 and thence through pipe 19 for discharge through opening 17 adjacent the nozzle tip 14. The overall operation of the device will now be described with reference to a description of how the unit may be used to accomplish an important requirement in eviscerating poultry.

Referring now more specifically to FIGS. 6 and 7, there is illustrated a partially processed bird, such as a turkey, which has been de-feathered and which has had its feet cut off at the hock joints. FIG. 6 shows the horizontal evisceration cut 41 as having been made in the abdomen of the bird immediately aft of the keel 42 of the bird. The circular vent cut 42 is indicated as also having been made circumscribing the vent opening 43. The area of skin and flesh designated at 44 is normally termed the bar strap. In general practice, after the two cuts 41 and 42 have been made and after the cloaca (connecting to the vent 43) has been milked or stripped of fecal matter (either according to the conventional practice or according to the practices of the present invention) the vent is tucked under the skin defined by the bar strap 44. Practice of the present method will preferably occur in the process of evisceration prior to the making of the horizontal cut 41 or the vent cut 42, and which is also prior to removal of any viscera or to any handling or disturbance of the bowel regions of the bird.

As shown in FIG. 7, it is possible to insert into the vent opening the nozzle tip 14 and outer end extremities of the barrel 13 of the eviscerating device hereinabove described in detail. Normally the adjustable stop member 20 will, depending on its temporarily fixed location along the barrel 13, determine the extent of maximum penetration that the nozzle end of the unit will be inserted into the vent of the bird. FIG. 7 illustrates the nozzle tip and outer end of the barrel 13 of a unit inserted into the vent of the bird. In view of the fact that the barrel 13 is connected to a source of vacuum through vacuum control gate valve F the suction force adjacent the nozzle end may be controlled before, during, and after the insertion of the nozzle end of the device into the vent of the bird. The sequence of operation of the vacuum control gate valve F and valve 31 are interrelated by operation of trigger D to prevent the device from evacuating and collapsing the cloaca or lower intestines around the nozzle tip, which would prevent flow of any materials through the opening adjacent rods 16, before a surge of air and water enters by way of tube 19. In normal practice, the trigger in being actuated first, turns on the water and air flow as the nozzle tip 14 of the unit is inserted into the vent opening. Further movement of the trigger D opens the vacuum control gate valve F to effect flushing and purging of fecal matter in the cloaca and lower intestines, due to the ingress of water and air by way of tube 19.

The staggering of operation of the vacuum control gate valve F and water-air valve E is particularly helpful in evacuating large birds which have been breeders. These birds are generally characterized by intestinal walls that are stretched and distended and which lack the resiliency of the non-breeders. As a result, when such birds are cleaned and when the barrel is removed after cleaning, if the suction, resulting from an open condition of vacuum control gate valve F, was enabled beyond the flushing caused by the inflow of air and water through valve assembly E, there would be a likelihood that the intestine would be sucked out—a fact which would no doubt result in contaminating the fowl. The staggering of the cycles avoids this.

Figure 2:
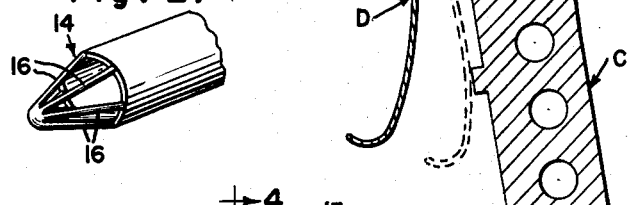
FIG. 2 is an enlarged perspective view of the nozzle tip of the device.
Figure 3:
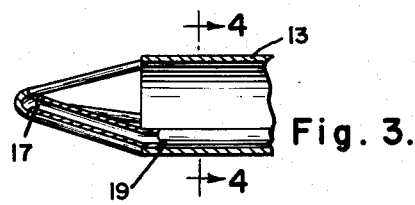
FIG. 3 is an enlarged side cross-section view of the nozzle end of the device.
Figure 4:
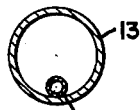
FIG. 4 is a cross-section view taken along line 4—4 of FIG. 3 to illustrate the orientation of the water-air and suction passages.
Figure 5:
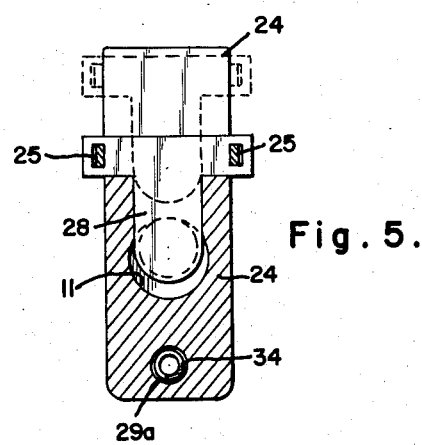
FIG. 5 is a view in cross-section taken along line 5—5 of FIG. 1 to illustrate the suction valve gate.

The openings in between rods 16 are of a size smaller than the diameter of the barrel 13 to prevent the larger stones from the bird's intestines to be drawn into the vacuum tube and cause it to be plugged or clogged. By making a series of smaller holes such as indicated at FIGURE 2 between rods 16, there is provided ample room for the passage of the water and normal fecal matter without permitting the passage of large bodies of materials, particularly stones, that could cause clogging of the suction outlet line.

In a typical application, air at a pressure of 3 to 5 p.s.i., water at a pressure of 5 to 7 p.s.i. and a 12 to 15" vacuum cooperate to effectively obtain the benefits of the invention though other combinations will no doubt work satisfactorily.

In view of the fact that the discharge of water and the suction removal thereof occurs substantially simultaneously, it is possible to obtain a very complete and adequate flushing of the cloaca and lower intestines of a bird in a very rapid time. Further, because the nozzle end of the device may be inserted a substantial distance into the cloaca and intestines, when the device is removed from the vent, there is little practical chance of there remaining any fecal matter that can drip from the vent opening to contact or soil the surrounding body regions of the bird.

After the cloaca and lower intestines have been flushed as aforesaid, the nozzle is removed and the vent cut 42 and horizontal cut 41 can be made without substantial likelihood of fecal matter soiling the bird. Upon making the cuts 41 and 42, the evisceration of the bird can be accomplished according to the usual practices.

The particular type of vacuum source to which the suction hose 26 may be connected and through which the fecal matter is withdrawn has not been hereinabove specifically shown or described for the reason that the same does not per se constitute any part of the present invention and is a conventional apparatus, the selection of which is well within the competence of those skilled in the art.

Although the foregoing invention has been described in some detail by way of illustration and example for purposes of clarity of understanding, it is understood that certain changes and modifications may be practiced within the spirit of the invention as limited only by the scope of the appended claims.

I claim:

1. A device useful in the evisceration of poultry comprising a frame supporting a tubular barrel projecting outwardly from said frame and converging to terminate in an outer open nozzle end; said nozzle end being adapted for insertion in the cloacal vent opening of the poultry, said barrel including therein a water-air discharge passage and a vacuum suction outlet passage, all communicating to the said open nozzle end of said barrel; and means respectively associated with said water-air passage and vacuum suction passage for selectively injecting water and air through said nozzle and withdrawing water, air and waste matter which accumulates adjacent said nozzle outwardly through said suction outlet passage.

2. A device useful in the evisceration of poultry comprising a frame, a vacuum suction tube projecting outwardly from said frame and converging to terminate in an open cone-shaped nozzle end, said nozzle end being adapted for insertion in the cloacal vent opening of the poultry, a water-air discharge tube of substantially smaller cross-section than said vacuum suction tube extending lengthwise interiorly of said vacuum suction tube to a point adjacent the nozzle end thereof; and means respectively associated with said water-air tube and said vacuum suction tube to simultaneously discharge water and air through said nozzle end while withdrawing water, air and waste matter which accumulates adjacent said nozzle end outwardly through said vacuum suction tube.

3. The combination of claim 2 and wherein the outer discharge end of said water-air tube extends interior of said cone-shaped nozzle and beyond the outer intake end of said vacuum suction tube.

4. The combination of claim 2 and wherein an external abutment member is mounted on said vacuum suction tube barrel for adjustable fixed positioning longitudinally thereof.

5. A device useful in the evisceration of poultry comprising a frame supporting a tubular barrel projecting outwardly from said frame and terminating in an outer open nozzle end; a water and air discharge tube of substantially smaller cross-section than said barrel extending lengthwise interiorly of said barrel to a point adjacent the nozzle end thereof; a vacuum suction hose connected to the rear of said barrel, and means respectively associated with said water and air discharge tube operable to discharge water and air through said nozzle end while water, air and waste matter which accumulates adjacent said nozzle end is withdrawn outwardly through said barrel and vacuum suction hose; said last named means including a continuous vacuum source connected to the suction hose to effect the withdrawal, a trigger actuated valve on said frame operable to selectively open and close flow of water and air through said water discharge tube, and a suction valve actuated by said trigger to open and interrupt the suction path between the barrel and said vacuum source.

6. The combination of claim 5 and wherein the outer discharge end of said water and air discharge tube extends beyond the outer end of said barrel.

7. A device useful in the evisceration of poultry comprising a frame supporting a vacuum suction barrel projecting outwardly from said frame and terminating in an outer open nozzle end; a combination water and air inlet tube of substantially smaller cross-section than said barrel extending lengthwise interiorly of said barrel to a point adjacent the nozzle end thereof; and means associated with said water-air inlet tube and said vacuum suction barrel selectively operable to discharge water and air through said nozzle end while withdrawing water, air and waste matter which accumulates adjacent said nozzle end outwardly through said vacuum suction barrel; said nozzle end of said barrel being defined by a plurality of rod members having an apex at the forwardmost end of the device and separated predetermined distances to block the flow of waste matter that is likely to cause malfunctioning of said device.

8. A device useful in the evisceration of poultry comprising a frame supporting a tubular barrel projecting outwardly from said frame and terminating in an outer open nozzle end and forming as a vacuum suction tube, a water and air discharge tube of substantially smaller cross-section than said barrel extending lengthwise interiorly of said barrel to a point adjacent the nozzle end thereof; and means respectively associated with said air-water discharge tube and said vacuum suction tube operable to substantially simultaneously discharge water and air through said nozzle end while withdrawing water, air and waste matter which accumulates adjacent said nozzle end outwardly through said vacuum suction tube; said last named means including a continuously maintained vacuum source connected to said vacuum suction tube, a first trigger actuated slide valve on said frame operable to selectively open and close the flow of water through said water and air discharge tube, a second trigger actuated valve for selectively opening and closing connection of said vacuum source to said barrel and means staggering the operating sequence of said valves, the said nozzle end of said barrel being defined by a conical tip apertured to permit water and air to be injected from said tube through said nozzle tip and to permit withdrawal of water and waste matter mixed therewith from exteriorly of said tip into said suction tube.

9. The combination of claim 8 and wherein the outer discharge end of said water and air discharge tube extends beyond the outer end of said barrel.

10. The combination of claim 8 and wherein an external abutment member is mounted on said barrel for adjustable fixed positioning longitudinally thereof.

References Cited in the file of this patent
UNITED STATES PATENTS

| | | |
|---|---|---|
| 2,427,840 | Davis | Sept. 23, 1947 |
| 2,723,831 | Ine | Nov. 15, 1955 |
| 2,795,817 | Dahlberg | June 18, 1957 |
| 2,830,319 | Muntz | Apr. 15, 1958 |
| 2,908,030 | Schuchman et al. | Oct. 13, 1959 |
| 2,943,346 | Jensen | July 5, 1960 |
| 2,997,736 | Ine | Aug. 29, 1961 |